United States Patent [19]

Mendoza

[11] 4,032,723
[45] June 28, 1977

[54] CORDLESS TELEPHONE SYSTEM

[76] Inventor: Luis Esteban Mendoza, 1806 Smokewood Ave., Fullerton, Calif. 92631

[22] Filed: Feb. 24, 1976

[21] Appl. No.: 661,017

[52] U.S. Cl. .............................. 179/41 A; 343/905; 325/364
[51] Int. Cl.² ......................................... H04Q 7/04
[58] Field of Search .......... 179/41 A; 325/67, 364; 343/702, 720, 726, 727; 730, 905, 906

[56] References Cited

UNITED STATES PATENTS

| | | | |
|---|---|---|---|
| 2,218,830 | 10/1940 | Rose et al. | 343/720 |
| 2,915,627 | 12/1959 | Spindler | 343/720 |
| 3,240,879 | 3/1966 | Bryant | 179/41 A |
| 3,290,601 | 12/1966 | Pinizzotto et al. | 343/905 |
| 3,317,841 | 5/1967 | Umanoff | 325/364 |
| 3,333,201 | 7/1967 | Hopengarten | 325/364 |
| 3,365,669 | 1/1968 | Funaki et al. | 325/364 |
| 3,680,128 | 7/1972 | Wille et al. | 343/702 |

*Primary Examiner*—Kathleen H. Claffy
*Assistant Examiner*—Gerald L. Brigance

[57] ABSTRACT

A duplex cordless telephone system with one link operating at approximately 1.7 Mhz is given improved range by utilizing only one side of the power cord for signal transmitting purposes at the fixed or base station and substituting a loaded conductor, free of confinement in a conduit, for the other side of the power cord normally used for signal transmission, thus forming a doublet antenna. Further, this improved system provides an "out-of-range" indicator on the mobile or remote telephone and, if desired, on the base station, which indicates when the cordless telephone is at a range in excess of the operating capability of the system.

3 Claims, 2 Drawing Figures

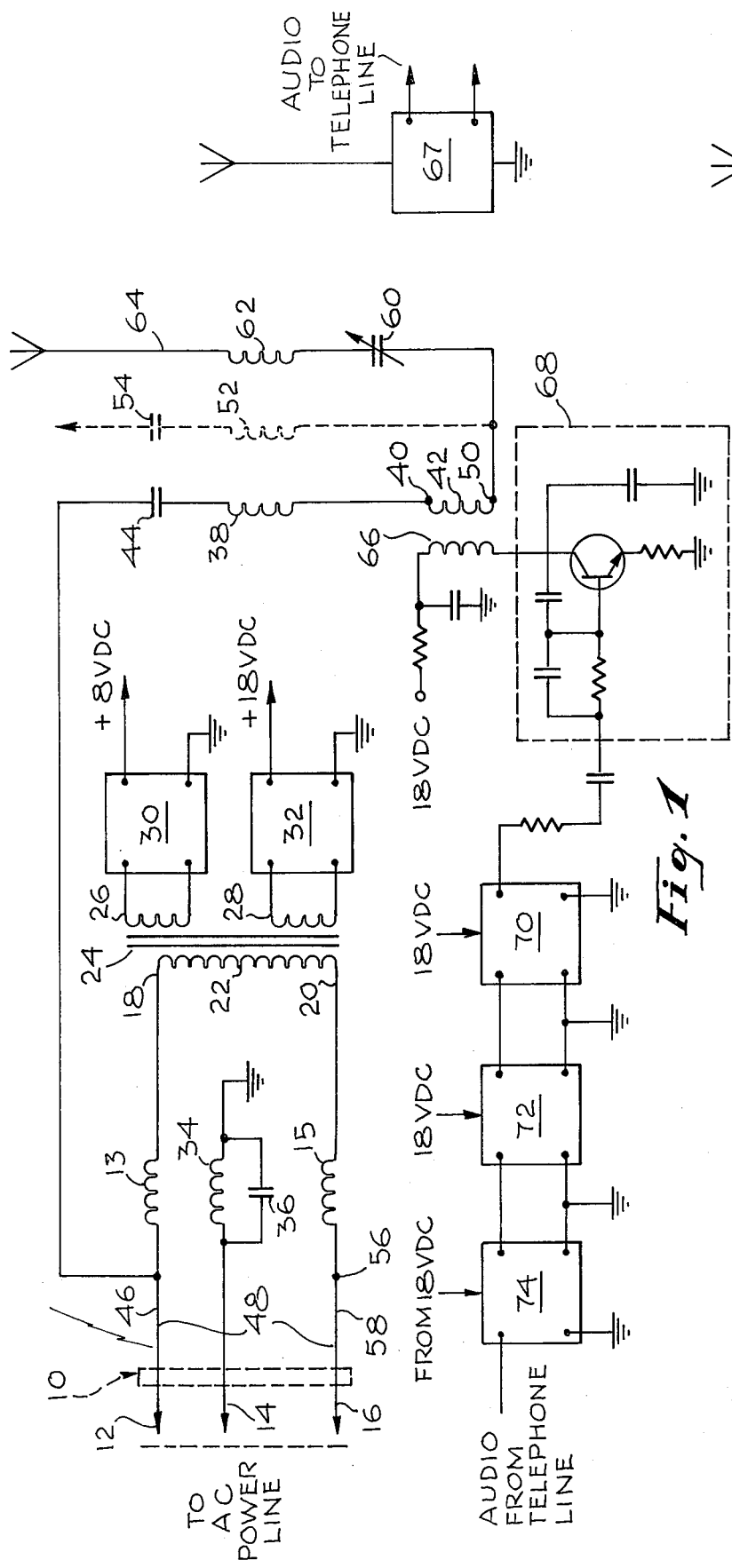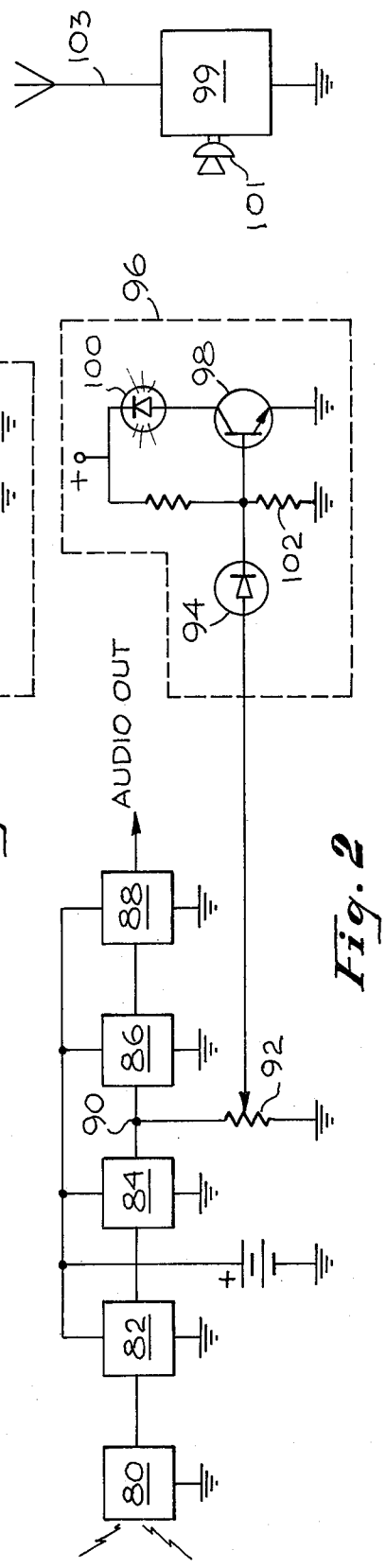

CORDLESS TELEPHONE SYSTEM

BACKGROUND OF THE INVENTION

1. Field of the Invention

This invention relates to duplex radio telephone systems and, more specifically, to cordless telephone systems.

2. Description of the Prior Art

Present day cordless telephone systems fall, generally, into two categories. The first of those categories is the cordless system which operates totally within the Citizens'Band spectrum, which is from 26.965 Mhz to 27.255 Mhz. In such systems the base unit (which is connected to the fixed telephone line through a coupler or directly) transmits, on a first frequency in that band of frequencies, incoming telephone signals, such as the ringing signal and voice signal or other intelligence signals, from the fixed location to the remote location where the mobile unit which is in the form of a telephone but includes radio circuits, receives and operates on the signals from the base station. The mobile unit transmits, on a second frequency, or channel, in the Citizens' Band, the voice or other intelligence and control signals developed at the mobile unit. The operating channels of the base station and mobile unit are spaced in frequency as far as is practicable so as to permit duplex operation i.e., simultaneous transmission and reception on both ends of the system—the base station and the mobile unit.

In the second category of cordless phone systems, the base station transmits its control and information signals on a low frequency, e.g., at 1.7 Mhz and the mobile unit transmits its signals in the 26.965 to 27.255 Mhz Citizens' Band. With the wide spacing of channels used in the system no echo or sidetone is evident in the telephone receiver of the mobile unit when signals are being transmitted from the mobile unit.

An example of a cordless telephone system is set forth in U.S. Pat. No. 3,449,750 (Sweigert). The system in the Sweigert patent uses channels separated about 6 Mhz which is broad spacing with respect to the first category systems and narrow spacing with respect to the second category of systems discussed hereinbefore.

The second category of systems has the inherent problem that a resonant fraction of a wavelength is very long at the 1.7 Mhz frequency and an antenna for transmission or reception at that frequency must be physically long to be resonant. In view of that circumstance, it is conventional to rely upon the A.C. wiring from which the power for the base station is derived to act as the signal carrier and radiator for the base station in the 1.7 Mhz range of frequencies. Unfortunately, because of the very large capacity to ground experienced in the electrical conduit through which the power lines run, the R-F signal from the base station is repidly attenuated.

The effective length of radiator is only slightly longer than the power cord running from the base station to the A.C. wall socket. Such a short radiator results in a severly limited range for the mobile station because the mobile unit quckly loses the signal from the base station as the mobile unit is prepared from the base station. Further, with prior art systems there was no positive indication at the remote or mobile unit when that unit moved out of the range for effective communication between it and the base station. Thus, the user of the mobile unit could be talking as he moved and be completely lost at the base station with the result that the user of the mobile station would be talking to no one and, when he discovered that fact, could be highly irritated.

Thus, it is an object of this invention to overcome in a cordless telephone system the problems and disadvantages set forth hereinbefore.

It is a further object of this invention to provide a cordless telephone system which will have an extended range for its low-frequency radio link.

It is a still further object of this invention to provide an improved cordless telephone system in which the user of the mobile unit is advised immediately upon his being separated from the base station a distance greater than the operating range of the system.

SUMMARY OF THE INVENTION

Stated briefly, the dual wire power cord and power line antenna conventionally used for transmitting signals from the base station is replaced by what constitutes a center-fed doublet antenna with one side of the power cord acting as one element of the doublet and an additional conductor, appropriately resonated and unconfined by a conduit, or the like acts as the other element of the doublet. Further, if the mobile unit moves out of the increased range produced by the improved antenna system the mobile unit user is automatically notified of that fact by a light or other indicator in the mobile unit.

BRIEF DESCRIPTION OF THE DRAWINGS

A better understanding of the present invention may be had from a consideration of the following description taken in connection with the accompanying drawings, in which:

FIG. 1 is a schematic diagram, partially in block form, of a cordless telephone base station according to the present invention; and, FIG. 2 is a schematic diagram, partially in block form, of a mobile unit for a cordless telephone, according to the present invention.

DETAILED DESCRIPTION OF THE PREFERRED EMBODIMENT

In FIG. 1, male power plug 10 includes pins 12, 14 and 16. Pins 12, 14 and 16 are adapted to engage the female connectors in a conventional wall socket, not shown. Pins 12 and 16 are connected to opposite ends 18 and 20, respectively, of primary 22 in power transformer 24 through R-F chokes 13 and 15, respectively. Transformer 24 has secondaries 26 and 28 connected to rectifier circuits 30 and 32, respectively to develop 8 and 18 volts D.C., respectively, for operating the associated base station equipment.

Pin 14, which represents power circuit ground, is connected through R-F choke 34 (resonated by condenser 36) to base station ground.

Loading coil 38, is connected, at one end to terminal 40 on antenna coil 42, and at its other end to resonating condenser 44 which, in turn, is connected to pin 12 of plug 10 through conductor 46 of line cord 48. It is to be noted that the connection of condenser 44 to conductor 46 in line cord 48 is made on the side of R-F choke 13 towards plug 10.

In prior base stations of this type, terminal 50 of antenna coil 42 would have been connected through loading coil 52 and resonating condenser 54 to point 56 on conductor 58 in line cord 48. Instead, in the system according to this invention, point 50 on antenna coil 42 is connected through resonating condenser 60 and loading coil 62 to conductor 64 which may be an insulation-covered conductor of 6 or 8 feet in length, approximately, which is, preferably, placed at an angle, up to 180°, with respect to power cord 46 to achieve, as nearly as possible, the characteristics of a doublet antenna.

R-F power appears in antenna coil 42 as a result of its being coupled to tank inductance 66 of linear R-F amplifier 68.

R-F oscillator 70 provides driving power to linear amplifier 68. Circuits for transistorized oscillators are well known in the art.

Modulator 72 produces narrow-bank F-M by techniques well known in the art and which, therefore, need not be described here.

Driving power for modulator 72 is obtained from audio amplifier 74. Circuits for transistorized audio amplifiers are legion and need not be described here.

Signals for driving audio amplifier 74 (including ringing and voice signals) are obtained from a hybrid transformer, not shown, which, in turn, is connected to the telephone line at the base station.

Appropriate operating potential is supplied to sections 68, 70, 72 and 74 from rectifier circuit 32.

The base station just described radiates a significantly improved signal over previous cordless phone transmitters of this type by reason of the improved antenna system described herein as a part of this invention.

The base station of FIG. 1 includes a transistorized superheterodyne receiver 67 of conventional form fixed-tuned in the Citizens' Band to the frequency of the transmitter in the mobile unit of FIG. 2.

In FIG. 2, a circuit for indicating, at the mobile unit, excessive distance thereof from the base station, is described. Antenna 80 which, at a frequency of approximately 1.7 Mhz may be a ferrite-rod loop antenna of the type used in transistorized broadcast receivers for consumer use, receives signals from the bast station transmitter when that transmitter is operating and when antenna 80 and the mobile unit in which it is continued, are within the field of the base station transmitting antenna comprising conductor 64 and conductor 46 in power cord 48. With 100 milliwatts input to R-F amplifier 68 and to the final R-F state in the mobile unit's transmitter (the upper limit of input power for unlicensed operation under Part 15 of the Rules and Regulations of the Federal Communications Commission) and utilizing conventional superheterodyne techniques in the base station and mobile unit receivers, the practical operating range for the mobile unit is about 100 meters from the base station. This range varies with many parameters, however. For example, weather, base station surroundings and mobile unit surroundings all affect the maximum range of operation of the system.

It is common in the usage of cordless telephones for the user to move about while communicating over the cordless phone which he is carrying as he moves. For example, he may move from one room to another in his home. If he moves from the living room to the kitchen, he may significantly change transmission and reception conditions. The kitchen conventionally contains massive metallic objects, such as refrigerators, and such objects may shield the receiver and transmitter portions of the mobile unit from those in the base station. When this happens, the signals may fall into the background noise and, if the person carrying the mobile unit continues to talk, his efforts will be wasted.

R-F signals intercepted by antenna 80 are amplified by amplifier 82 and fed to first detector-oscillator 84 where they are converted to I-F signals. Those I-F signals are amplified in I-F amplifier 86 and fed to second detector 88, which may be a discriminator when the base station is transmitting F-M signals. The circuits for ferrite antenna 80, R-F amplifier 82, first detector 84, I-F amplifier 86 and detector 88 may be found in any one of the many transistor handbooks on the market today and, thus, those circuits need not be described here.

According to this invention, I-F signals are taken from point 90 on the output connector from I-F amplifier 86 and pass through potentiometer 92 to ground. Potentiometer 92 acts as a voltage divider and permits application to diode 94 of a desired portion of the signal appearing at point 90. Potentiometer 92 thus acts as a sensitivity control for the out-of-range indicator circuit 96. Transistor 98, in the presence of adequate rectified carrier signal from diode 94, is cut off, cutting off LED 100. When the signal level from point 90 falls below a predetermined minimum, the biasing voltage appearing across resistor 102 is reduced, transistor 90 turns on and the full battery voltage in the mobile unit appears across LED 100, causing it to emit light. The user is thus warned that he is out of range and stops talking until LED 100 is extinguished and communications are re-established. By having transistor 90 and LED 100 turn on only when the mobile unit is out of range, the drain on the batteries in the mobile unit is minimized and extended use of the mobile unit is assured.

It should be understood that a different indicator may be substituted for LED 100, for example, an annunciator, but the battery drain of the device should be minimal.

Potentiometer 92 may be replaced by a fixed resistor when the minimum signal for satisfactory communications between mobile unit and base station has been established.

The mobile unit of FIG. 2 includes transmitter 99 modulated by signals from telephone microphone 101 to produce modulated R-F signals radiated, in the Citizens' Band by antenna 103.

While a particular embodiment has been shown and described in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

I claim:
1. A cordless, two-way telephone system, including:
a base station and
a mobile unit;
said base station including a first radio transmitter designed to operate in the range of 1.7 Mhz and a first radio receiver operable in the range of 27 Mhz;
said first radio transmitter including:
a power supply, a power cord coupled to said power supply and having at least first and second electri- cal conductors for connecting said power supply to a source of a.c. power, the length of said first conductor in said power cord being less than one-eighth of a wavelength in said range of 1.7 Mhz, said first conductor being maintained above ground potential, for signals in said 1.7 Mhz range, at its end coupled to said power supply, a source of modulatable R-F signals connected to said power supply and powered thereby; and an antenna coil coupled to said source of R-F signals, said antenna coil having first and second terminals;

first means coupling said first terminal of said antenna coil to said first conductor, only, of said power cord;

an antenna conductor spaced from said first and second conductors and having a length substantially less than one-eighth wavelength in said range of 1.7 Mhz;

second means coupling said second terminal of said antenna coil to one end of said antenna conductor;

said mobile unit including a second radio transmitter and a second radio receiver;

said second radio receiver including a ferrite rod antenna, a first detector coupled to said ferrite rod antenna for producing I-F signals when said ferrite rod antenna is in the R-F field from said first radio transmitter;

indicator means for indicating when the signal from said base station is below a level which permits communication between said base station and said mobile unit, said indicator means including rectifying means coupled to said first detector for rectifying the I-F signals therefrom, switching means responsive to the absence of adequate output from said rectifying means to enter a conducting state, a source of operating voltage, and an out-of-communication indicator connected between said source of operating voltage and said switching means and responsive to the conducting state of said switching means to emit light.

2. Apparatus according to claim 1 in which said second means includes a series-connected variable capacitor and loading inductor.

3. Apparatus according to claim 1 in which said out-of-communication indicator is an LED.

* * * * *